United States Patent
Grewal et al.

(10) Patent No.: US 9,769,123 B2
(45) Date of Patent: Sep. 19, 2017

(54) MITIGATING UNAUTHORIZED ACCESS TO DATA TRAFFIC

(71) Applicant: Intel Corporation, Santa Clara, CA (US)

(72) Inventors: Karanvir S. Grewal, Hillsboro, OR (US); Ravi L. Sahita, Portland, OR (US); David Durham, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/863,168

(22) Filed: Apr. 15, 2013

(65) Prior Publication Data

US 2014/0068704 A1    Mar. 6, 2014

Related U.S. Application Data

(60) Provisional application No. 61/697,497, filed on Sep. 6, 2012.

(51) Int. Cl.
*G06F 21/60* (2013.01)
*H04L 29/06* (2006.01)
(Continued)

(52) U.S. Cl.
CPC .......... *H04L 63/0428* (2013.01); *G06F 21/52* (2013.01); *G06F 21/53* (2013.01);
(Continued)

(58) Field of Classification Search
CPC ................................ G06F 21/606; G06F 21/85
See application file for complete search history.

(56) References Cited

U.S. PATENT DOCUMENTS 8,578,477 B1 * 11/2013 Lin ........................ G06F 21/554
726/21
2004/0015694 A1 * 1/2004 DeTreville ............ G06F 9/4406
713/172
(Continued)

FOREIGN PATENT DOCUMENTS

| EP | 1 681 630 A1 | 7/2006 |
| KR | 2010-00800401 | 7/2010 |
| WO | WO 2014/039665 A1 | 3/2014 |

OTHER PUBLICATIONS

The IEEE and The Open Group. (Aug. 29, 2016). mmap. Retrieved from The Open Group: http://pubs.opengroup.org/onlinepubs/009695399/functions/mmap.html.*
(Continued)

*Primary Examiner* — Shewaye Gelagay
*Assistant Examiner* — Michael Guirguis
(74) *Attorney, Agent, or Firm* — Patent Capital Group

(57) ABSTRACT

One particular example implementation of an apparatus for mitigating unauthorized access to data traffic, comprises: an operating system stack to allocate unprotected kernel transfer buffers; a hypervisor to allocate protected memory data buffers, where data is to be stored in the protected memory data buffers before being copied to the unprotected kernel transfer buffers; and an encoder module to encrypt the data stored in the protected memory data buffers, where the unprotected kernel transfer buffers receive a copy the encrypted data.

23 Claims, 7 Drawing Sheets

(51) Int. Cl.
*G06F 21/52* (2013.01)
*G06F 21/53* (2013.01)
*G06F 21/78* (2013.01)
*G06F 21/85* (2013.01)

(52) U.S. Cl.
CPC .......... *G06F 21/606* (2013.01); *G06F 21/78* (2013.01); *G06F 21/85* (2013.01)

(56) References Cited

U.S. PATENT DOCUMENTS

| | | | |
|---|---|---|---|
| 2005/0086666 A1 | 4/2005 | Nason et al. | |
| 2006/0005047 A1 | 1/2006 | Lekatsas et al. | |
| 2009/0113216 A1 | 4/2009 | Chen et al. | |
| 2009/0113425 A1* | 4/2009 | Ports | G06F 9/4426 718/1 |
| 2009/0222673 A1 | 9/2009 | Schneck et al. | |
| 2009/0315670 A1* | 12/2009 | Naressi | G06F 21/10 340/5.8 |
| 2009/0328195 A1* | 12/2009 | Smith | G06F 21/575 726/16 |
| 2010/0083381 A1* | 4/2010 | Khosravi | G06F 21/567 726/24 |
| 2010/0169666 A1 | 7/2010 | Dewan et al. | |
| 2010/0223419 A1 | 9/2010 | Cardona et al. | |
| 2011/0131423 A1* | 6/2011 | Ponsini | G06F 21/53 713/189 |
| 2011/0182419 A1 | 7/2011 | Coomer | |
| 2012/0216049 A1 | 8/2012 | Boivie et al. | |
| 2012/0221767 A1 | 8/2012 | Post et al. | |

OTHER PUBLICATIONS

International Search Report and Written Opinion in International Application No. PCT/US2013/058239, mailed Dec. 16, 2013, 10 pages.

Notice of Preliminary Rejection in KR 2015-7003220, mailed on Oct. 21, 2015, English translation, 6 pages.

International Preliminary Report on Patentability in International Application No. PCT/US2013/058239, mailed Mar. 19, 2015, 7 pages.

Official Communication in EP Application No. EP 13 83 4942, mailed on Dec. 1, 2016, 4 pages.

Supplementary European Search Report in EP Application No. EP 13 83 4942, mailed on Mar. 29, 2016, 6 pages.

* cited by examiner

MITIGATING UNAUTHORIZED ACCESS TO DATA TRAFFIC

CROSS-REFERENCE TO RELATED APPLICATION

This application claims the benefit of priority under 35 U.S.C. §119(e) to U.S. Provisional Application Ser. No. 61/697,497, "PREVENTING UNAUTHORIZED ACCESS TO AUDIO VIDEO STREAMS" filed Sep. 6, 2012 which is hereby incorporated by reference in its entirety.

TECHNICAL FIELD

Embodiments described herein generally relate to mitigating unauthorized access to data traffic.

BACKGROUND

As electronic devices become more ubiquitous in the everyday lives of users they are heavily relied upon to securely process and store information. Unfortunately, the risk of unauthorized access to electronic devices and information has increased with the proliferation of the electronic devices. Illegal access to computer system information can be obtained by exploiting various security flaws found in the electronic devices. A common flaw is the susceptibility of data theft either directly from software as it executes, or, from the operating system (OS) or hardware on which the software is executing. Viruses, terminate- and stay-resident programs (TSRs), rootkits, co-resident software, multi-threaded OS processes, Trojan horses, worms, hackers, spoof programs, keypress password capturers, macro-recorders, sniffers, and the like can be effective at stealing data and can be generally classified as malware or rogue applications. Malware (or a rogue application) can steal data through the insertion of the malware as kernel filter drivers thus attacking kernel transfer buffers and/or an OS stack, or alternatively, the malware may simply ask for a resource and store/stream the data to a designated back end server. Some malware can hook the kernel drivers and tap into the data flow. It would be advantageous if an electronic device could be better protected against rogue software or a rogue application.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

The following detailed description sets forth example embodiments of apparatuses, methods, and systems relating to dual touch surface multiple function input devices. Features, such as structure(s), function(s), and/or characteristic(s) for example, are described with reference to one embodiment as a matter of convenience; various embodiments may be implemented with any suitable one or more described features.

Figure 1:
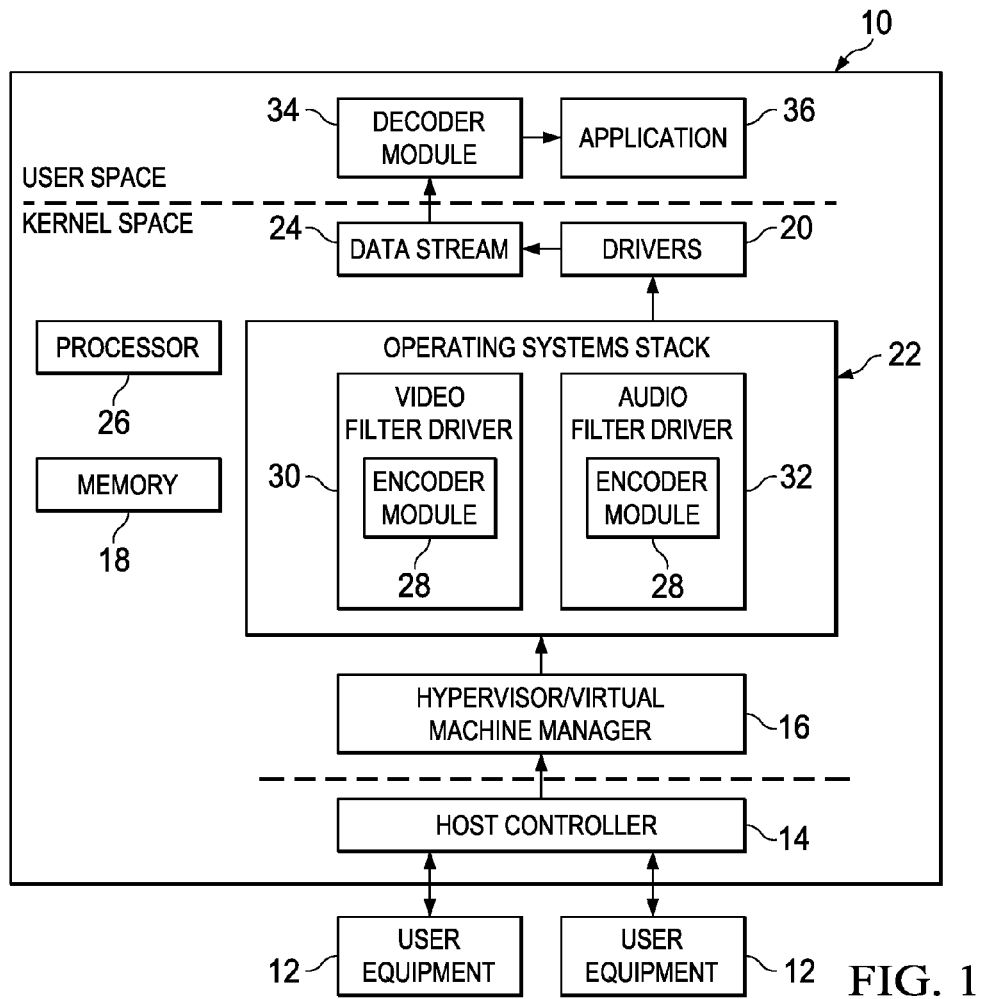
FIG. 1 is a simplified block diagram illustrating an embodiment of an electronic device, in accordance with at least one embodiment of the present disclosure.

FIG. 1 is a simplified block diagram illustrating an embodiment of electronic device 10, in accordance with at least one embodiment. Electronic device 10 can include a host controller 14, a hypervisor/virtual machine manager 16, memory 18, drivers 20, an operating system (OS) stack 22, a data stream 24 (e.g., an audio/video data stream), a processor 26, a decoder module 34, and an application 36. OS stack 22 may include a video filter driver 30 and an audio filter driver 32 (other drivers may also be included but are not shown). Video filter driver 30 and audio filter driver 32 can each include an encoder module 28.

Data (or data traffic) can flow from one or more (authorized) user equipment 12 to electronic device 10 and through an existing OS stack (e.g., OS stack 22). The existing OS stack can include OS-provided universal serial bus (USB) drivers and kernel services. These kernel services may provide a set of application program interfaces (APIs) which are used by filter drivers to insert functionality into a data path. Unprotected kernel transfer buffers can be allocated by OS stack 22 and managed by streaming kernel services. Protected audio/video buffers can be managed by USB filter drivers inserted into the OS stack using APIs provided by the OS stack.

The examples of FIG. 1 are merely examples of an electronic configuration, and do not limit the scope of the claims. For example, the number of electrical components may vary, the placement of the electrical components may vary, and/or the like. The use of the terms "audio" and "video" have been done for purposes of clarity and example only. While reference is made to an audio data stream, a video data stream, audio drivers, video drivers, audio filter drivers, video filter drivers, etc., the concepts described herein may be applied to other types of data traffic and drivers without departing from the scope and the broad teachings of the present disclosure. The term "data traffic" includes, but is not limited to data that may flow from user equipment 12 through electronic device 10.

Processor 26 can execute any type of instructions associated with the data to achieve the operations detailed herein in this Specification. In one example, processor 26 can transform an element or an article (e.g., data) from one state or thing to another state or thing. In another example, the activities outlined herein may be implemented with fixed logic or programmable logic (e.g., software/computer instructions executed by the processor) and the elements identified herein can be some type of a programmable processor, programmable digital logic (e.g., a field programmable gate array [FPGA], an erasable programmable read only memory (EPROM), an electrically erasable programmable ROM (EEPROM)) or an ASIC that can include digital logic, software, code, electronic instructions, or any suitable combination thereof.

Electronic device 10 is inclusive of devices such as a receiver, a computer, a desktop computer, a laptop computer, an Internet appliance, a set-top box, an Internet radio device (IRD), a cell phone, a smart phone, a tablet, a personal digital assistant (PDA), a game console, a mobile Internet device, a Google Android™, an iPhone™, and iPad™, or any other device, component, element, or object capable of voice, audio, video, media, or other data exchanges. User equipment 12 may be inclusive of a suitable interface to a human user, such as a microphone, camera, webcam, display, a keyboard, a touchpad, a remote control, a peripheral device, or other equipment capable of generating voice, audio, video, media, or other data exchanges.

Multimedia content creation and consumption is on the rise across a wide variety of electronic devices from cell phones to traditional laptops, desktop computers to backend cloud servers. Audio and/or video data is predominantly used in our daily lives from cell phone calls, video chat with family and friends, creating/uploading photos and videos to social media sites, etc. There have been an increasing number of attacks on this data, with recent examples including computer viruses/worms enabling a microphone on a device without a user's knowledge to listen into private conversations and spying on people by enabling/stealing the data from an integrated/discreet camera connected to an electronic device. The ability to steal this data is relatively easy, as most of the devices either run stock programming systems, which are easy to tap by the insertion of malware directly accessing kernel transfer buffers (e.g., via hooks on the driver in OS stack 22), or alternatively, the applications are able to simply ask for a resource (e.g., a microphone or webcam) and store/stream the data from the resource to a back end server of choice. Some OS's may provide application level access control to the data (e.g., only a video chat application can connect to a camera device or webcam). However, even though this may prevent another application from accessing the data, malware can tap into the kernel transfer buffers and snoop a private conversation. Other OS's may not even provide this high level filtering mechanism, as they are open source and can easily be modified by anyone with sufficient knowledge.

In an embodiment, electronic device 10 can be configured to protect data flows within the OS with appropriate obfuscation techniques, so even if malware is able to insert itself within the kernel transfer buffers, the malware will not be able to access the data payloads. Because the internal and external connection of choice for a majority of peripherals is a USB, such as a USB camera and/or microphone, the examples used herein include audio and video data. However, similar approaches could be applied for other types of data and connection types (e.g., PCI, MIPI, CSI, etc.) as well as other peripherals (keyboard, mouse, etc.).

Device 10 can be configured to protect data buffers and payloads as the data is moved from user equipment 12 to a user level application (e.g., application 36) and possibly beyond. Device 10 can be configured to protect data buffers receiving data from user equipment 12, thus ensuring that only authorized buffers (e.g., protected transfer buffers 60) receive the data. Once the data is received, device 10 may encrypt the data and pass it through an existing OS stack, where the data can only be decrypted by an authorized application that has a correct cryptographic key to decode the data (e.g., decoder module 34). Additionally, device 10 may include data integrity or authenticity assertions to the data as the data is passed to a user level application (e.g., application 36) and possibly beyond. Data integrity or authenticity ensures that the data originated from the correct source and furthermore was not subject to any modifications or replay attacks by any malware in the data path. The recipient of the data is able to validate these data integrity assertions by verifying the cryptographic hashes or signatures passed with the data. Hence, even though malware may be able to access (e.g., hook, tap into, etc.) the OS stack or kernel transfer buffers and access the encrypted data, the malware will not get access to the data payload without having the correct credentials and cryptographic keys to decipher the data. Before the data is encrypted, the data may be stored in protected buffers that are only accessible by trusted applications. This allows for protection of the data buffers so they are not accessible by any unknown kernel/user code and protects memory mapped input/output (MMIO) space designated for user equipment 12 so malware cannot modify/tamper with the memory interfacing with user equipment 12 and with the received data. In addition, a hypervisor may control access to the protected memory using an input/output memory management unit programmed by the hypervisor, where the protected memory is not accessible by unauthorized user equipment 12. Hence, obfuscation of the data payload as the data flows through the unmodified OS stack and kernel transfer buffers may be prevented before the data is released to an authorized application that has the correct cryptographic keys to decrypt the data.

In one illustrative example, to stream audio and/or video data to a peer, an audio and/or video streaming application may rely on a number of OS services, which can extract data from a microphone and/or camera and forward the data to the audio and/or video streaming application. As part of this process, the audio and/or video streaming application may use OS services such as kernel streaming, USB video, USB port, etc. and provide a hierarchical set of services to connect to a USB device, negotiate different attributes such as data format, data speed, etc. and stream the data to the audio and/or video streaming application. The audio/video streaming application can initiate a request for the audio and/or video data to the appropriate OS services, which in turn can utilize video filter driver 30 and/or audio filter driver 32 to move the data up the OS stack and kernel transfer buffers. These drivers interface with USB port/hub drivers, which can in turn communicate with the appropriate user equipment 12 through host controller 14. Hypervisor/virtual machine manager 16 may map user equipment 12 MMIO regions in memory 18 and define different data structures used to interface with user equipment 12. Among other things, the data structures can include commands to user equipment 12, events received back from user equipment 12, and pointers to memory regions (transfer buffers) specified by upper layers of the system to handle data movement to and from user equipment 12. In the case of audio and/or video data, the audio and/or video data may be received from user equipment 12, but in other cases such as USB storage, the data may flow bidirectionally.

From a high level perspective, there can be two secure regions of the memory in use: a secure MMIO region used to interface with user equipment 12 and secure transfer buffers used for data movement. MMIO regions can contain mappings and pointers to the secure transfer buffers. Device 10 may use direct memory access (DMA) to the transfer buffers and a port driver may manage the availability of these buffers to user equipment 12. Sometimes these buffers are also referred to as ring buffers, as they are typically recycled in a circular fashion. As data becomes available in a given transfer buffer, and interrupt is generated, which triggers an asynchronous event, indicating the availability of data. Once the data is passed to application 36 the transfer buffers can be cycled back to the port driver and made available to user equipment 12 for the next batch of data.

In this mode of operation, during an insertion attack, kernel (Ring 0) malware can tap into the kernel transfer buffers as a filter driver and steal or copy the data undetected. The nefarious activity can be achieved by silently copying the data and sending it somewhere else, as well as the originally intended recipient. Other variations are also possible, where the data may be modified, replayed or replaced in some manner, but essentially stem from the same principle of insertion in the data path. If insertion is not possible, a more advanced attack may be to reprogram the MMIO regions to point to alternative buffers controlled by the malware so the data is only received by the malware.

Device 10 can be configured to protect against an insertion attack by inserting a filter driver below a video and/or audio driver (e.g., video filter driver 30 and/or audio filter driver 32) and above a port driver (e.g., host controller 14). Using the inserted filter driver, secure transfer buffers can be created which are passed down to the filter driver, instead of the transfer buffers received from the higher layer drivers (which are held in a cache in the filter driver). In another example, the above data confidentiality/authenticity may be directly incorporated with the lowest level port drivers communicating directly with electronic device 10 or directly in electronic device 10. This allows core capabilities to move closer to hardware interfacing with user equipment 12 and ultimately may be implemented either in user equipment 12 or the hardware interfacing with user equipment 12 (e.g., USB host controller interface 14, etc.). Furthermore, using host controller 14 the system can protect the secure transfer buffers so they are only accessible to filter driver code by providing permission on extended page table (EPT) structures associated with secure transfer buffer memory regions and code selections in the drivers. Once data is received at the secure transfer buffers, the data may be encrypted in any manner while it is inaccessible to any other components. Once the data is encrypted, the data can be copied to the kernel transfer buffers and the data may also be copied to a user-space (e.g., application memory) in the normal manner. If any malware tries to access the data, the malware will encounter encrypted text. Authorized applications (e.g., application 36), which have been provisioned with correct cryptographic keys (in decoder module 34), are able to decrypt the data. In an embodiment, decoder module 34 and application 36 may be secured such that the data is not accessible to any other malicious application.

A second attack from malware may be to directly modify the MMIO space and make the appropriate MMIO device descriptors point to transfer buffers owned by the malware itself. Electronic device 10 can mitigate against this attack in a similar manner as described above by providing protections around the device MMIO regions, which point to the secure buffers used to transfer the data to/from user equipment 12. This includes identifying the data structures in user equipment 12 managed by host controller 14 and protecting these from modifications by any unauthorized components. Using EPT structures to mark these memory regions as read only except from a trusted code path, electronic device 10 can be configured to obtain notifications (events) on modifications of these regions and validate that the MMIO structures are not subverted before committing any changes to the data structures. This allows electronic device 10 to essentially be a last barricade to modifying these regions and allows for a sanity check to deny any undesirable changes to the different structures used to map the transfer buffers receiving data.

Figure 2:
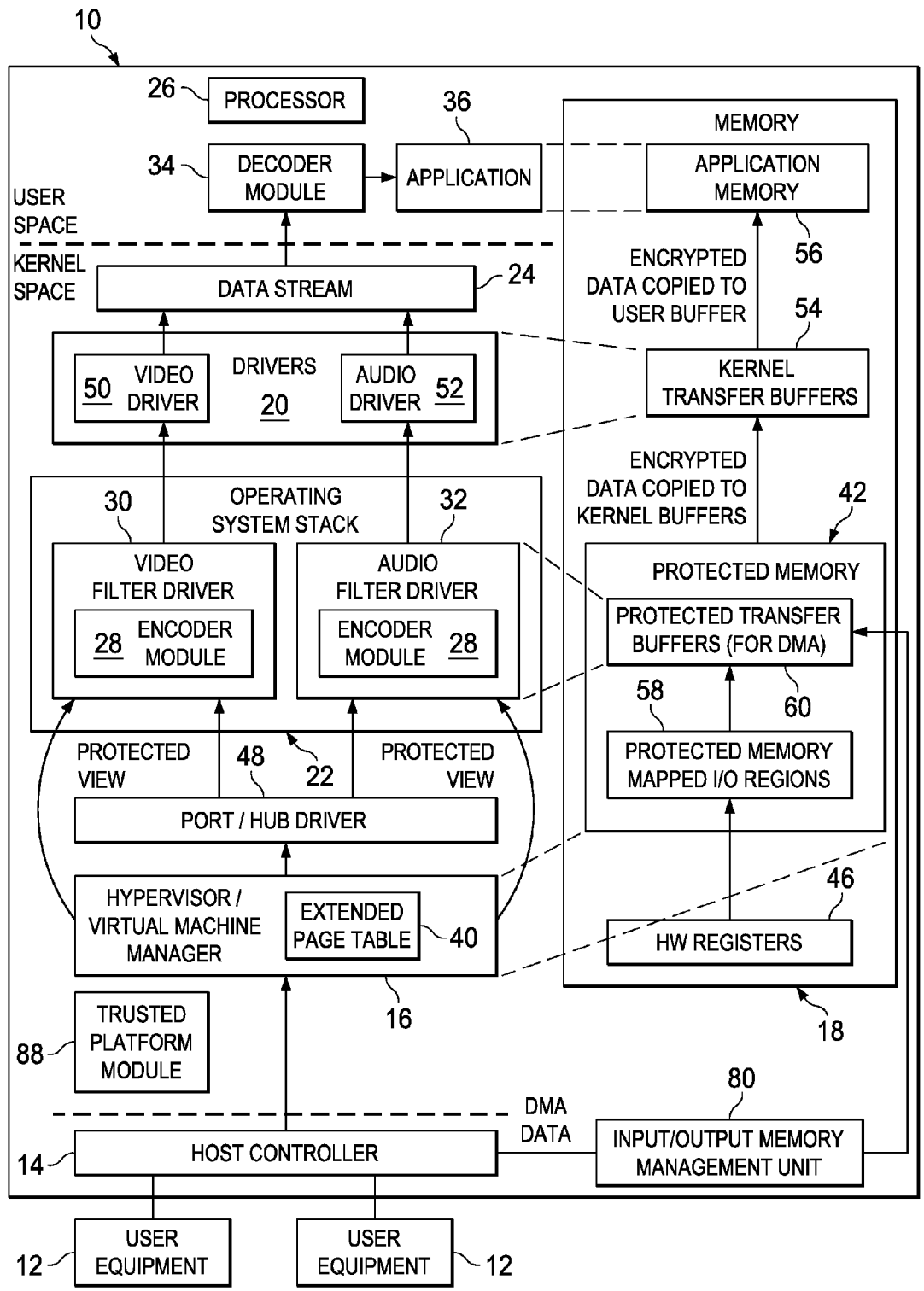
FIG. 2 is a simplified block diagram illustrating an embodiment of an electronic device, in accordance with at least one embodiment of the present disclosure.

FIG. 2 is a simplified block diagram illustrating an embodiment of electronic device 10, in accordance with at least one example embodiment. Electronic device 10 can include host controller 14, hypervisor/virtual machine manager 16, memory 18, drivers 20, OS stack 22, processor 26, decoder module 34, application 36, a port/hub driver 48, input/output memory management unit 80 (I/O MMU), and a trusted platform module 88. Hypervisor/virtual machine manager 16 can include an extended page table 40. Extended page table 40 may be a data structure used by a virtual memory system to store the mapping between virtual addresses and physical addresses. Memory 18 can include protected memory 42, hardware registers 46, kernel transfer buffers 54, and application memory 56 (e.g., user-space). Protected memory 42 can include protected MMIO regions 58 and protected transfer buffers 60. Drivers 20 can include a video driver 50 and an audio driver 52. Video filter driver 30 and audio filter driver 32 can each include an encoder module 26. I/O MMU 80 can be programmed by hypervisor/virtual machine manager 16 to control access to protected MMIO regions 58 such that protected MMIO regions 58 and protected transfer buffers 60 are not accessible by unauthorized user equipment 12. Kernel transfer buffers 54 are configured to transfer data to application 36.

During boot up of electronic device 10 (or when user equipment is connected to electronic device 10 or electronic device 10 wakes up) trusted platform module 88 may be used to provide assertions that hypervisor/virtual manager 16 and host controller software booted in a secure manner and were not affected (i.e., replaced or undermined) by any malware entity. Hypervisor/virtual machine manager 16 can create or allocate protected memory 42. Hardware registers 46 may access protected MMIO regions 58 to determine the address of protected transfer buffers 60 for host controller 14. As data is received at host controller 14 from user equipment 12, the data may be sent to protected transfer buffers 60 in protected memory 42. Video filter driver 30 and/or audio filter driver 32 can access the data in protected transfer buffers 60 and the data may be encrypted or encoded using encoder module 28. Once the data is encrypted, it can pass to drivers 20 and through unprotected memory data buffers (e.g., kernel transfer buffers 54). From there, the data enters into kernel streaming (e.g., data stream 24) and is sent to decoder module 34 where the data is decrypted or decoded and sent to application 36.

Figure 3:
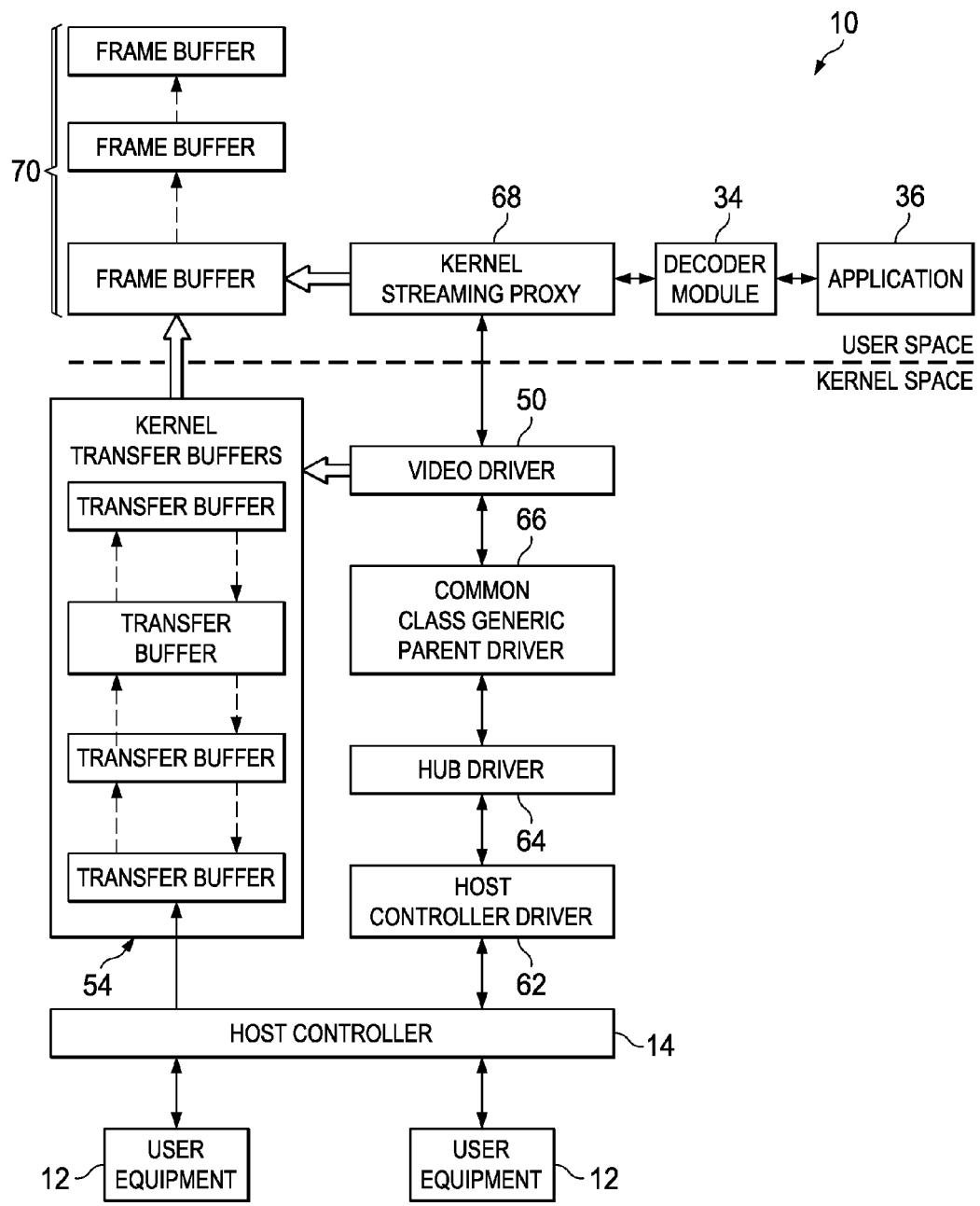
FIG. 3 is a simplified block diagram illustrating an embodiment of an electronic device, in accordance with at least one embodiment of the present disclosure.

FIG. 3 is a simplified block diagram illustrating an embodiment of electronic device 10, in accordance with at least one example embodiment. Electronic device 10 can include host controller 14, decoder module 34, application 36, video driver 50, kernel transfer buffers 54, a host controller driver 62, a hub driver 64, a common class generic parent driver 66, kernel streaming proxy 68, and frame buffers 70.

Host controller driver 62, hub driver 64, and common class generic parent driver 66 operate or control user equipment 12 and host controller 14. Kernel streaming proxy 68 represents kernel streaming filters of kernel streaming mini drivers by assuming the characteristics of those kernel streaming filters. Kernel streaming proxy 68 then sends control down to kernel transfer buffers 54 while reflecting events from application 36. Kernel streaming proxy 68 may also let applications control and retrieve information from kernel streaming objects. Frame buffers 70 can buffer video (and audio) frames used by application 36.

Figure 4:
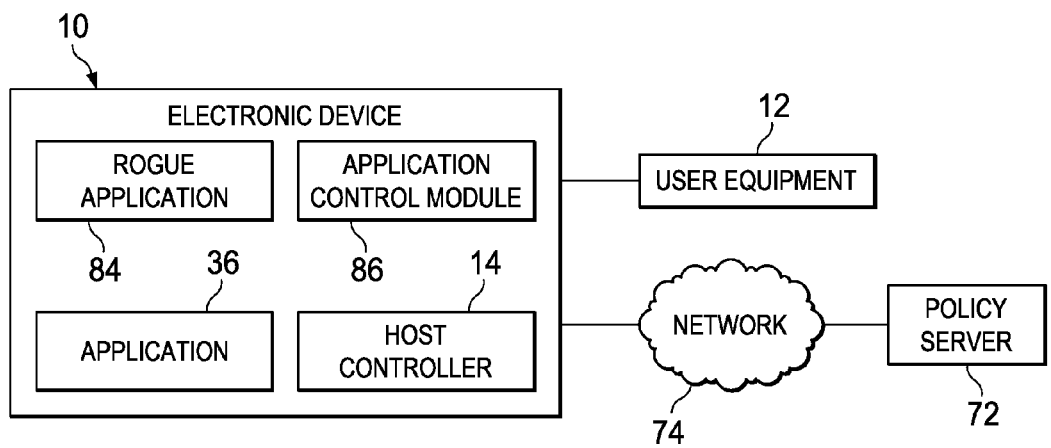
FIG. 4 is a simplified block diagram illustrating an embodiment of an electronic device, in accordance with at least one embodiment of the present disclosure.

FIG. 4 is a simplified block diagram illustrating an embodiment of electronic device 10, in accordance with at least one example embodiment. Electronic device 10 can include host controller 14, application 36, a rogue application 84, and an application control module 86. In an example, electronic device 10 may be infected with rogue application 84. Rogue application 84 may be malware (or malicious or malevolent software) used or created to disrupt computer operation, gather sensitive information, or gain access to private computer systems. Application control module 86 can be configured to control application 36. In this example, application control module 86 has its data and code protected by a hypervisor/virtual machine manager (e.g., hypervisor/virtual machine manager 16) to ensure malware is not able to circumvent any policy received from a policy server 72. Electronic device 10 can be in communication with policy server 72 through network 74. Using network 74, policy server 72 can provide (in an enterprise environment, for example) access control policies for electronic device 10. For example, based on the location of electronic device 10, policy server 72 may issue a policy to electronic device 10 that nothing is allowed access to data from user equipment 12 (e.g., the data is encrypted such that no application can access the data). In a specific example, electronic device 10 may be located in a secure area and user equipment 12 may be a camera or microphone. If user equipment 12 is generating video and/or audio data, the data is not accessible to any application. Such a policy can prevent rogue application 84 from obtaining video and/or audio data from user equipment 12. In another example, policy server 72 may issue a policy to electronic device 10 that only authorized applications are authorized to access the data generated by user equipment 12. In a specific example, user equipment may be a camera and if user equipment 12 is generating video and/or audio data, only an authorized application (such as an application for a video chat) can access the data.

Network 74 represents a series of points or nodes of interconnected communication paths for receiving and transmitting packets of information. Network 74 offers a communicative interface between electronic device 12 and policy server 72, and may be any local area network (LAN), wireless local area network (WLAN), metropolitan area network (MAN), wide area network (WAN), virtual private network (VPN), Intranet, Extranet, or any other appropriate architecture or system that facilitates network communications in a network environment. Network communications, which can be inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). The term 'data' as used herein, refers to any type of binary, numeric, voice, video, textual, or script data, or any type of source or object code, or any other suitable information in any appropriate format that may be communicated from one point to another in computing devices (e.g., electronic devices) and/or networks.

Figure 5:
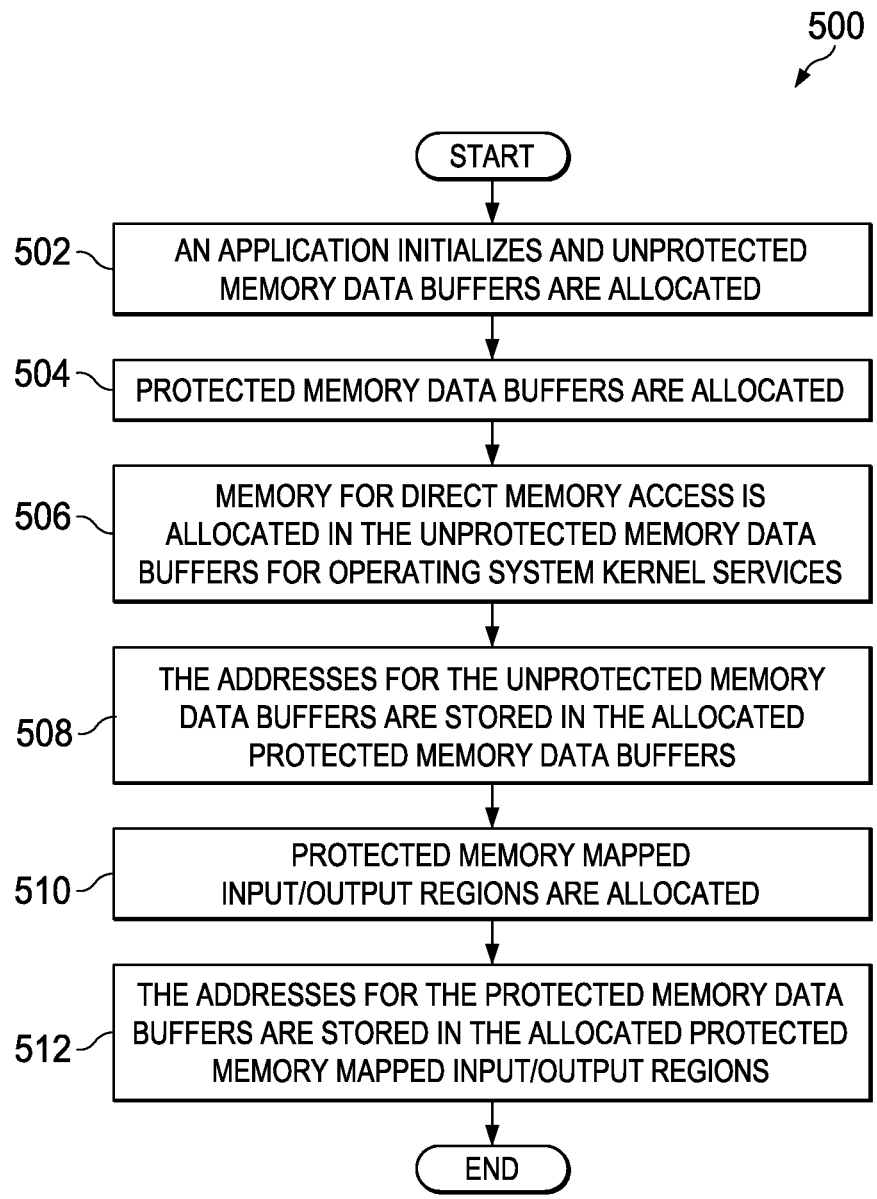
FIG. 5 illustrates, an example flowchart in accordance with at least one embodiment of the present disclosure.

FIG. 5 is a simplified flowchart 500 illustrating example activities of mitigating unauthorized access to audio and video traffic. At 502, an application (e.g., application 36) initializes, and unprotected memory data buffers (e.g., kernel transfer buffers 54) are allocated. These unprotected memory data buffers may be part of kernel transfer buffers. At 504, protected memory data buffers (e.g., protected transfer buffers 60 in protected memory 42) are allocated. At 506, memory for DMA is allocated in the unprotected memory data buffers for OS kernel services. At 508, the addresses for the unprotected memory data buffers are stored in the allocated protected memory data buffers. At 510, protected MMIO regions (e.g., MMIO regions 58) are allocated. At 512, the addresses for the protected memory data buffers are stored in the allocated MMIO regions.

Figure 6:
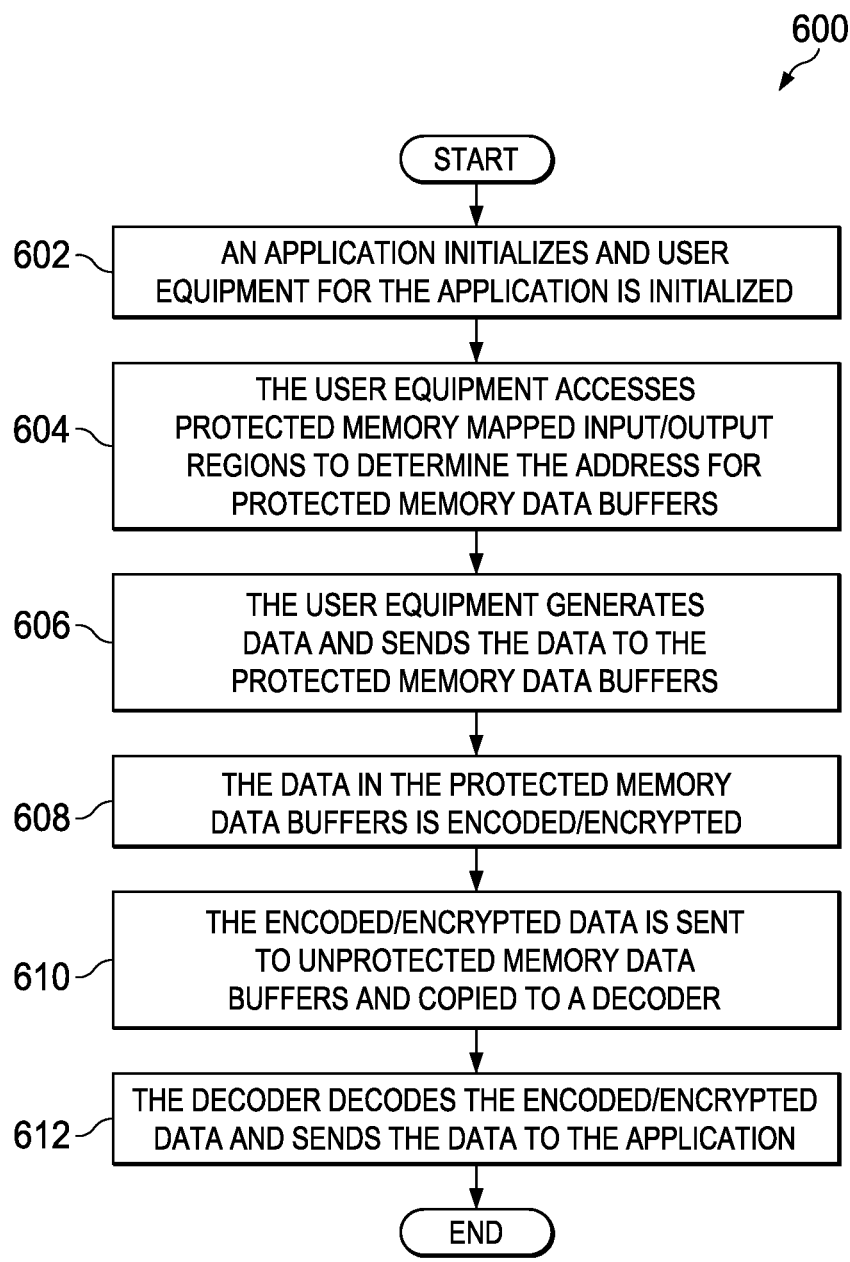
FIG. 6 illustrates, an example flowchart in accordance with at least one embodiment of the present disclosure.

FIG. 6 is a simplified flowchart 600 illustrating additional example activities of mitigating unauthorized access to audio and video traffic. At 602, an application (e.g., application 36) initializes and user equipment (e.g., user equipment 12) for the application is initialized. At 604, the user equipment accesses protected MMIO regions (e.g., protected MMIO regions 58) to determine the address for protected memory data buffers (e.g., protected transfer buffers 60). At 606, the user equipment generates data and sends the data to the protected memory data buffers. At 608, the data in the protected memory data buffers is encoded/encrypted. For example, video data may be encoded/encrypted using encoder module 28 in video filter driver 30 and audio data may be encoded/encrypted using encoder module 28 in audio filter driver 32. At 610, the encoded/encrypted data is sent to unprotected memory data buffers (e.g., kernel transfer buffers 54) and copied to a decoder (e.g., decoder module 34). At 612, the decoder decodes the encoded/encrypted data and sends the data to the application.

Figure 7:
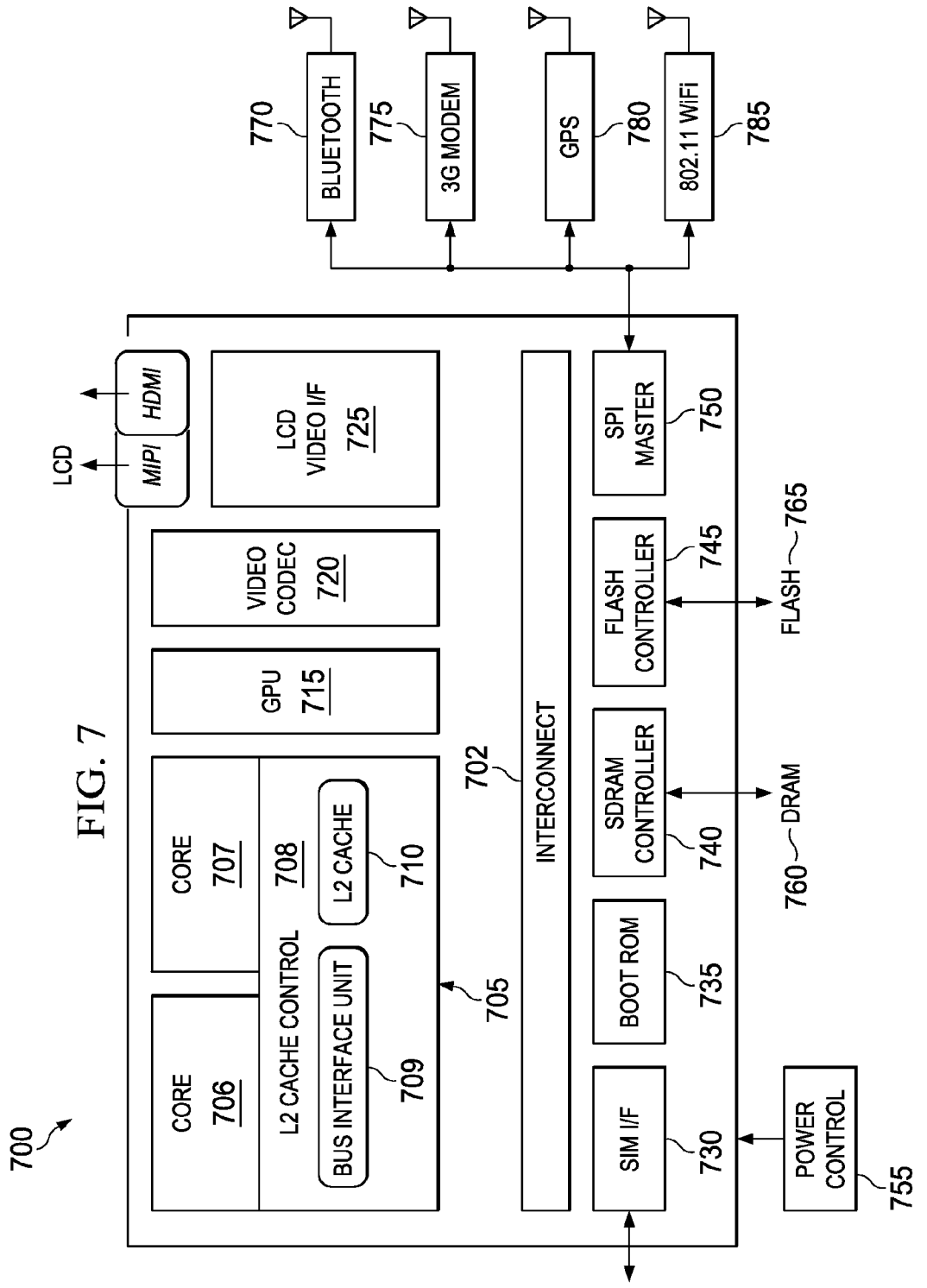
FIG. 7 is a simplified block diagram associated with an example ARM ecosystem system on chip (SOC) of the present disclosure.

FIG. 7 is a simplified block diagram associated with an example ARM ecosystem SOC 700 of the present disclosure. In at least one embodiment, electronic device 10, shown and described herein, may be configured in the same or similar manner as exemplary ARM ecosystem SOC 700. At least one example implementation of the present disclosure can include an integration of the feature of mitigating unauthorized access to data traffic and an ARM component. For example, the example of FIG. 7 can be associated with any ARM core (e.g., A-9, A-15, etc.). Further, the architecture can be part of any type of tablet, smartphone (inclusive of Android™ phones, i-Phones™), i-Pad™, Google Nexus™, Microsoft Surfacer™, personal computer, server, video processing components, desktop computer, laptop computer (inclusive of any type of notebook), Ultrabook™ system, any type of touch-enabled input device, etc.

In this example of FIG. 7, ARM ecosystem SOC 700 may include multiple cores 706-707, an L2 cache control 708, a bus interface unit 709, an L2 cache 710, a graphics processing unit (GPU) 715, an interconnect 702, a video codec 720, and a liquid crystal display (LCD) I/F 725, which may be associated with mobile industry processor interface (MIPI)/high-definition multimedia interface (HDMI) links that couple to an LDC.

ARM ecosystem SOC 700 may also include a subscriber identity module (SIM) I/F 730, a boot read-only memory (ROM) 735, a synchronous dynamic random access memory (SDRAM) controller 740, a flash controller 745, a serial peripheral interface (SPI) master 750, a suitable power control 755, a dynamic RAM (DRAM) 760, and flash 765. In addition, one or more example embodiments can include one or more communication capabilities, interfaces, and features such as instances of Bluetooth™ 760, a 3G modem 775 (or 4G/5G/nG), a global positioning system (GPS) 780, and an 802.11 WiFi 785.

In operation, the example of FIG. 7 can offer processing capabilities, along with data protection to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one embodiment, the core processor may implement an out-of-order superscalar pipeline with a coupled low-latency level-2 cache.

Figure 8:
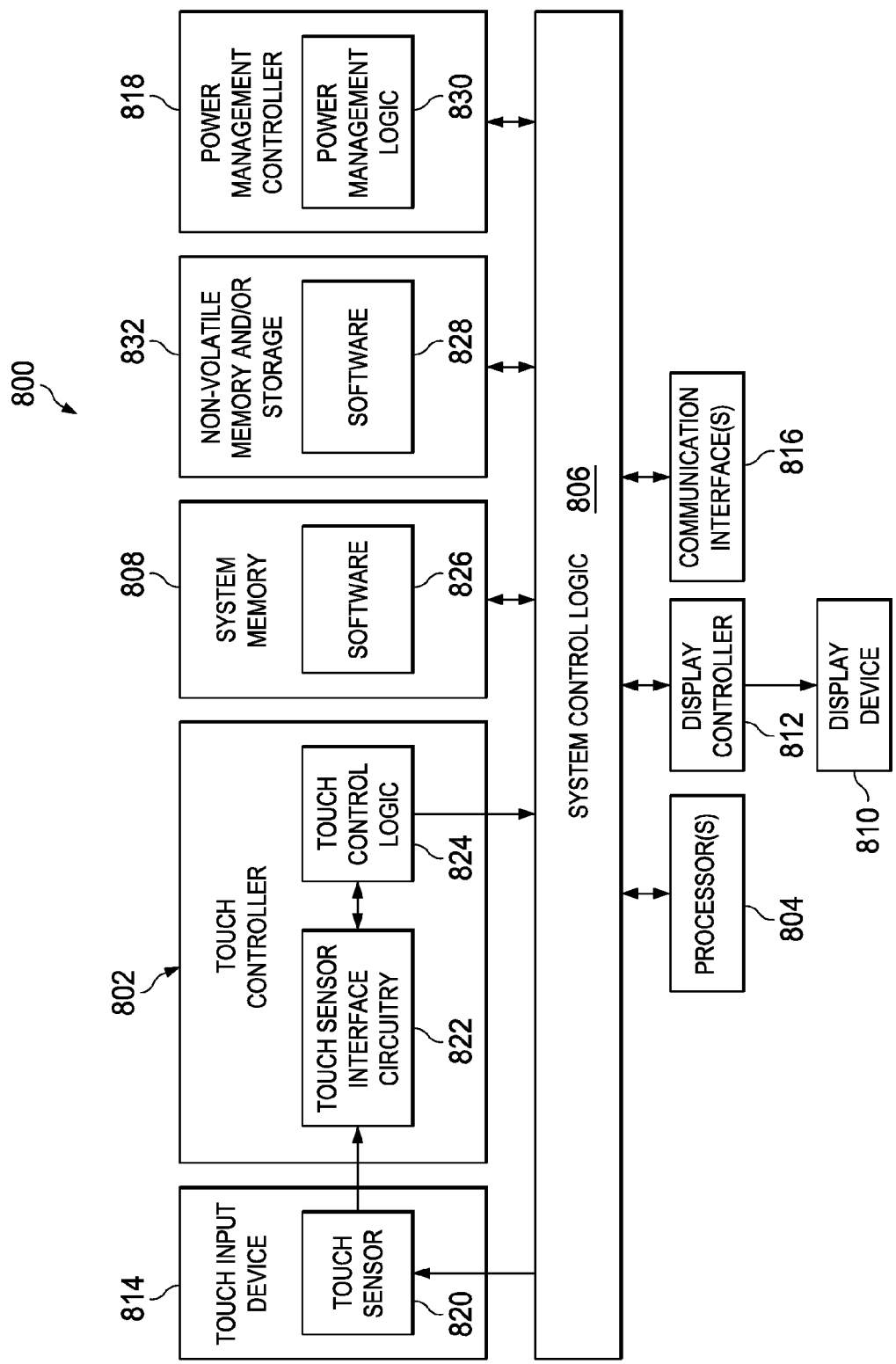
FIG. 8 is a simplified block diagram illustrating example logic that may be used to execute activities associated with the present disclosure.

FIG. 8 is a simplified block diagram illustrating potential electronics and logic that may be associated with any of the mitigation operations discussed herein. In at least one example embodiment, system 800 can include a touch controller 802, one or more processors 804, system control logic 806 coupled to at least one of processor(s) 804, system memory 808 coupled to system control logic 806, non-volatile memory and/or storage device(s) 832 coupled to system control logic 806, display controller 812 coupled to system control logic 806, display controller 812 coupled to a display device 810, power management controller 818 coupled to system control logic 806, and/or communication interfaces 816 coupled to system control logic 806.

System control logic 806, in at least one embodiment, can include any suitable interface controllers to provide for any suitable interface to at least one processor 804 and/or to any suitable device or component in communication with system control logic 806. System control logic 806, in at least one embodiment, can include one or more memory controllers to provide an interface to system memory 808. System memory 808 may be used to load and store data and/or instructions, for example, for system 800. System memory 808, in at least one embodiment, can include any suitable volatile memory, such as suitable dynamic random access memory (DRAM) for example. System control logic 806, in at least one embodiment, can include one or more I/O controllers to provide an interface to display device 810, touch controller 802, and non-volatile memory and/or storage device(s) 832.

Non-volatile memory and/or storage device(s) 832 may be used to store data and/or instructions, for example within software 828. Non-volatile memory and/or storage device(s) 832 may include any suitable non-volatile memory, such as flash memory for example, and/or may include any suitable non-volatile storage device(s), such as one or more hard disc drives (HDDs), one or more compact disc (CD) drives, and/or one or more digital versatile disc (DVD) drives for example.

Power management controller 818 may include power management logic 830 configured to control various power management and/or power saving functions. In at least one example embodiment, power management controller 818 is configured to reduce the power consumption of components or devices of system 800 that may either be operated at reduced power or turned off when the electronic device is in a closed configuration. For example, in at least one embodiment, when the electronic device is in a closed configuration, power management controller 818 performs one or more of the following: power down the unused portion of the display and/or any backlight associated therewith; allow one or more of processor(s) 804 to go to a lower power state if less computing power is required in the closed configuration; and shutdown any devices and/or components that are unused when an electronic device is in the closed configuration.

Communications interface(s) 816 may provide an interface for system 800 to communicate over one or more networks and/or with any other suitable device. Communications interface(s) 816 may include any suitable hardware and/or firmware. Communications interface(s) 816, in at least one example embodiment, may include, for example, a network adapter, a wireless network adapter, a telephone modem, and/or a wireless modem. System control logic 806, in at least one embodiment, can include one or more I/O controllers to provide an interface to any suitable input/output device(s) such as, for example, an audio device to help convert sound into corresponding digital signals and/or to help convert digital signals into corresponding sound, a camera, a camcorder, a printer, and/or a scanner.

For at least one embodiment, at least one processor 804 may be packaged together with logic for one or more controllers of system control logic 806. In at least one embodiment, at least one processor 804 may be packaged together with logic for one or more controllers of system control logic 806 to form a System in Package (SiP). In at least one embodiment, at least one processor 804 may be integrated on the same die with logic for one or more controllers of system control logic 806. For at least one embodiment, at least one processor 804 may be integrated on the same die with logic for one or more controllers of system control logic 806 to form a System on Chip (SoC).

For touch control, touch controller 802 may include touch sensor interface circuitry 822 and touch control logic 824. Touch sensor interface circuitry 822 may be coupled to detect touch input over a first touch surface layer and a second touch surface layer of a display (i.e., display device 810). Touch sensor interface circuitry 822 may include any suitable circuitry that may depend, for example, at least in part on the touch-sensitive technology used for a touch input device. Touch sensor interface circuitry 822, in one embodiment, may support any suitable multi-touch technology. Touch sensor interface circuitry 822, in at least one embodiment, can include any suitable circuitry to convert analog signals corresponding to a first touch surface layer and a second surface layer into any suitable digital touch input data. Suitable digital touch input data for at least one embodiment may include, for example, touch location or coordinate data.

Touch control logic 824 may be coupled to help control touch sensor interface circuitry 822 in any suitable manner to detect touch input over a first touch surface layer and a second touch surface layer. Touch control logic 824 for at least one example embodiment may also be coupled to output in any suitable manner digital touch input data corresponding to touch input detected by touch sensor interface circuitry 822. Touch control logic 824 may be implemented using any suitable logic, including any suitable hardware, firmware, and/or software logic (e.g., non-transitory tangible media), that may depend, for example, at least in part on the circuitry used for touch sensor interface circuitry 822. Touch control logic 824 for at least one embodiment may support any suitable multi-touch technology.

Touch control logic 824 may be coupled to output digital touch input data to system control logic 806 and/or at least one processor 804 for processing. At least one processor 804 for at least one embodiment may execute any suitable software to process digital touch input data output from touch control logic 824. Suitable software may include, for example, any suitable driver software and/or any suitable application software. As illustrated in FIG. 8, system memory 808 may store suitable software 826 and/or non-volatile memory and/or storage device(s).

Note that in some example implementations, the functions outlined herein may be implemented in conjunction with logic that is encoded in one or more tangible machine readable storage media (e.g., embedded logic provided in an application-specific integrated circuit (ASIC), in digital signal processor (DSP) instructions, software (potentially inclusive of object code and source code) to be executed by a processor, or other similar machine, etc.), which may be non-transitory. In some of these instances, memory elements can store data used for the operations described herein. This can include the memory elements being able to store software, logic, code, or processor instructions that are executed to carry out the activities described herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a DSP, an erasable programmable read only memory (EPROM), electrically erasable programmable read-only memory (EEPROM)) or an ASIC that can include digital logic, software, code, electronic instructions, or any suitable combination thereof.

The embodiments of methods, hardware, software, firmware or code set forth above may be implemented via instructions or code stored on at least one machine-accessible, machine readable, computer accessible, or computer readable medium, which is executable by a processing element. A machine-accessible/readable medium includes any transitory or non-transitory mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other forms of storage devices for holding information received from transitory (propagated) signals (e.g., carrier waves, infrared signals, digital signals); etc., which are to be distinguished from the non-transitory mediums that may receive information there from.

Note that with the examples provided above, as well as numerous other examples provided herein, interaction may be described in terms of layers, protocols, interfaces, spaces, and environments more generally. However, this has been done for purposes of clarity and example only. In certain cases, it may be easier to describe one or more of the functionalities of a given set of flows by only referencing a limited number of components. It should be appreciated that the architectures discussed herein (and its teachings) are readily scalable and can accommodate a large number of components, as well as more complicated/sophisticated arrangements and configurations. Accordingly, the examples provided should not limit the scope or inhibit the broad teachings of the present disclosure, as potentially applied to a myriad of other architectures.

It is also important to note that the blocks in the flow diagrams illustrate only some of the possible signaling scenarios and patterns that may be executed by, or within, the circuits discussed herein. Some of these blocks may be deleted or removed where appropriate, or these operations or activities may be modified or changed considerably without departing from the scope of teachings provided herein. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by the present disclosure in that any suitable arrangements, chronologies, configurations, and timing mechanisms may be provided without departing from the teachings provided herein.

It is also imperative to note that all of the Specifications, protocols, and relationships outlined herein (e.g., specific commands, timing intervals, supporting ancillary components, etc.) have only been offered for purposes of example and teaching only. Each of these data may be varied considerably without departing from the spirit of the present disclosure, or the scope of the appended claims. The specifications apply to many varying and non-limiting examples and, accordingly, they should be construed as such. In the foregoing description, example embodiments have been described. Various modifications and changes may be made to such embodiments without departing from the scope of the appended claims. The description and drawings are, accordingly, to be regarded in an illustrative rather than a restrictive sense.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (7) of 35 U.S.C. section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

OTHER NOTES AND EXAMPLES

Example A1 is an apparatus for mitigating unauthorized access to data traffic, comprising: an operating system stack to allocate unprotected kernel transfer buffers; a hypervisor to allocate protected memory data buffers, where data is to be stored in the protected memory data buffers before being copied to the unprotected kernel transfer buffers; and an encoder module to encrypt the data stored in the protected memory data buffers where the unprotected kernel transfer buffers receive a copy of the encrypted data.

In Example A2, the subject matter of Example A1 can optionally include where the hypervisor is configured to protect the protected memory data buffers using extended page tables so that the protected memory data buffers are not accessible to unauthorized software.

In Example A3, the subject matter of any one of Examples A1-A2 can optionally include where authorized filter drivers can access the protected memory data buffers.

In Example A4, the subject matter of any one of the Examples A2-A3 can optionally include an input/output memory management unit programmed by the hypervisor to control access to the protected memory data buffers, where the protected memory data buffers are not accessible by unauthorized user equipment.

In Example A5, the subject matter of Example A1 can optionally include where the unprotected kernel transfer buffers and the protected memory data buffers are to be allocated when an application that will use the data is initialized.

In Example A6, the subject matter of any one of Examples A1-A5 can optionally include where the hypervisor is configured to allocate secure memory mapped input/output (MMIO) regions, where addresses for the protected memory data buffers are to be stored in the secure MMIO regions.

In Example A7, the subject matter of Example A6 can optionally include where only authorized user equipment can access the secure MMIO regions.

In Example A8, the subject matter of any one of Examples A1-A7 can optionally include where the data is at least one of video data and audio data, and where a policy is constructed to automatically control access to the data based on a location of the apparatus.

In Example A9, the subject matter of any one of Examples A1-A8 can optionally include an input/output memory management unit to ensure that the data stored in the protected memory data buffers originated from an authorized source and was not subject to modifications or replay attacks by malware.

In Example A10, the subject matter of Example 9 can optionally include where the input/output memory management unit is configured to validate data integrity by verifying at least one cryptographic hash or at least one signature passed with the data from the authorized source.

In Example A11 the subject matter of any one of Examples A1-A10 can optionally include where the unprotected kernel transfer buffers are used to copy the data to an application that requested the data.

In Example A12, the subject matter of any one of Examples A1-A11 can optionally include where the application that requested the data is configured to decrypt the data.

In Example A13 the subject matter of any one of Examples A6-A12 can optionally include where the protected memory data buffers are protected by the hypervisor.

Example C1 is at least one machine readable storage medium having instructions stored thereon for mitigating unauthorized access to data traffic, the instructions when executed by a processor cause the processor to: allocate unprotected kernel transfer buffers; allocate protected memory data buffers, where data is stored in the protected memory data buffers before being copied to the unprotected kernel transfer buffers; encrypt the data stored in the protected memory data buffers; and copy the encrypted data to the unprotected kernel transfer buffers.

In Example C2, the subject matter of Example C1 can optionally include where the protected memory data buffers are protected by a hypervisor using extended page tables so that the protected memory data buffers are not accessible to unauthorized software.

In Example C3, the subject matter of any one of Examples C1-C2 can optionally include where authorized filter drivers can access the protected memory data buffers.

In Example C4, the subject matter of any one of Examples C2-C3 can optionally include where the instructions, when executed by the processor, further cause the processor to control access to the protected memory data buffers using an input/output memory management unit programmed by the hypervisor, where the protected memory data buffers are not accessible by unauthorized user equipment.

In Example C5, the subject matter of Example C1 can optionally include where, the unprotected kernel transfer buffers and the protected memory data buffers are allocated when an application that will use the data is initialized.

In Example C6, the subject matter of any one of Example C1-C5 can optionally include where the instructions, when executed by the processor, further cause the processor to allocate secure memory mapped input/output (MMIO) regions, where addresses for the protected memory data buffers are stored in the secure MMIO regions.

In Example C7, the subject matter of Example C6 can optionally include where only authorized user equipment can access the secure MMIO regions.

In Example C8, the subject matter of any one of Examples C1-C7 can optionally include where the data is at least one of video data and audio data, and where a policy is constructed to automatically control access to the data based on a location of the at least one machine readable storage medium.

In Example C9, the subject matter of any one of Examples C1-C8 can optionally include where the instructions, when executed by the processor, further cause the processor to ensure that the data stored in the protected memory data buffers originated from an authorized source and was not subject to modifications or replay attacks by malware.

In Example C10, the subject matter of Example C9 can optionally include where the instructions, when executed by the processor, further cause the processor to validate data integrity by verifying at least one cryptographic hash or at least one signature passed with the data from the authorized source.

In Example C11, the subject matter of any one of Examples C1-C10 can optionally include where the unprotected kernel transfer buffers are used to copy the data to an application that requested the data.

In Example C12, the subject matter of any one of Examples C1-C11 can optionally include where the application that requested the data decrypts the data.

In Example C13, the subject matter of any one of Examples C6-C12 can optionally include where the protected memory data buffers are protected by a hypervisor.

Example M1 is a method for mitigating unauthorized access to data traffic, comprising: allocating unprotected kernel transfer buffers; allocating protected memory data buffers, where data is stored in the protected memory data buffers before being copied to the unprotected kernel transfer buffers; encrypting the data stored in the protected memory data buffers; and copy the encrypted data to the unprotected kernel transfer buffers.

In Example M2, the subject matter Example M1 can optionally include where the protected memory data buffers are protected by a hypervisor using extended page tables so that that protected memory data buffers are not accessible to unauthorized software.

In Example M3, the subject matter of any one of Examples M1-M2 can optionally include where authorized filter drivers can access the protected memory data buffers.

In Example M4, the subject matter of any one of Examples M2-M3 can optionally include controlling access to the protected memory data buffers using an input/output memory management unit programmed by the hypervisor, where the protected memory data buffers are not accessible by unauthorized user equipment.

In Example M5, the subject matter of Example M1 can optionally include where, the unprotected kernel transfer buffers and the protected memory data buffers are allocated when an application that will use the data is initialized.

In Example M6, the subject matter of any one of the Examples M1-M5 can optionally include allocating secure memory mapped input/output (MMIO) regions, where addresses for the protected memory data buffers are stored in the secure MMIO regions.

In Example M7, the subject matter of Example M6 can optionally include where only authorized user equipment can access the secure MMIO regions.

In Example M8, the subject matter of any one of the Examples M1-M7 can optionally include where the data is at least one of video data and audio data, and where a policy is constructed to automatically control access to the data based on a location of the protected memory data buffers.

In Example M9, the subject matter of any one of Examples M1-M8 can optionally include ensuring that the data stored in the protected memory data buffers originated from an authorized source and was not subject to modifications or replay attacks by malware.

In Example M10, the subject matter of Example M9 can optionally include validating data integrity by verifying at least one cryptographic hash or at least one signature passed with the data from the authorized source.

In Example M11, the subject matter of any one of Examples M1-M10 can optionally include where the unprotected kernel transfer buffers are used to copy the data to an application that requested the data.

In Example M12, the subject matter of any one of Examples M1-M11 can optionally include where the application that requested the data decrypts the data.

In Example M13, the subject matter of any one of Examples M6-M12 can optionally include where the protected memory data buffers are protected by a hypervisor.

Example E1 is an apparatus for mitigating unauthorized access to data traffic, comprising means for: allocating unprotected kernel transfer buffers; allocating protected memory data buffers, where data is stored in the protected memory data buffers before being copied to the unprotected kernel transfer buffers; encrypting the data stored in the protected memory data buffers; and copying the encrypted data to the unprotected kernel transfer buffers.

In Example E2, the subject matter of Example E1 can optionally include where the protected memory data buffers are protected by a hypervisor using extended page tables so that that protected memory data buffers are not accessible to unauthorized software.

In Example E3, the subject matter of any one of Examples E1-E2 can optionally include where authorized filter drivers can access the protected memory data buffers.

In Example E4, the subject matter of any one of the Examples E2-E3 can optionally include further means for controlling access to the protected memory data buffers using an input/output memory management unit programmed by the hypervisor, where the protected memory data buffers are not accessible by unauthorized user equipment.

In Example E5, the subject matter of Example E1 can optionally include where, the unprotected kernel transfer buffers and the protected memory data buffers are allocated when an application that will use the data is initialized.

In Example E6, the subject matter of any one of Examples E1-E5 can optionally include further means for allocating secure memory mapped input/output (MMIO) regions, where addresses for the protected memory data buffers are stored in the secure MMIO regions.

In Example E7, the subject matter of Example E6 can optionally include where only authorized user equipment can access the secure MMIO regions.

In Example E8, the subject matter of any one of Examples E1-E7 can optionally include where the data is at least one of video data and audio data, and where a policy is constructed to automatically control access to the data based on a location of the apparatus.

In Example E9, the subject matter of any one of Examples E1-E8 can optionally include further means for ensuring that the data stored in the protected memory data buffers originated from an authorized source and was not subject to modifications or replay attacks by malware.

In Example E10, the subject matter of Example E9 can optionally include further means for validating data integrity by verifying at least one cryptographic hash or at least one signature passed with the data from the authorized source.

In Example E11 the subject matter of any one of Examples E1-E10 can optionally include where the unprotected kernel transfer buffers are used to copy the data to an application that requested the data.

In Example E12, the subject matter of any one of Examples E1-E11 can optionally include where the application that requested the data decrypts the data.

In Example E13 the subject matter of any one of Examples E6-E12 can optionally include where the protected memory data buffers are protected by a hypervisor.

Example X1 is a machine-readable storage medium including machine-readable instructions, when executed, to implement a method or realize an apparatus as in any one of the Examples A1-A13 and M1-M13.

Example Y1 is an apparatus comprising means for performing of any of the Example methods M1-M13.

In Example Y2, the subject matter of Example Y1 can optionally include the means for performing the method comprising a processor and a memory.

In Example Y3, the subject matter of Example Y2 can optionally include the memory comprising machine-readable instructions, that when executed cause the apparatus to perform any of the Example methods M1-M13.

In Example Y4, the subject matter of any one of Examples Y1-Y3 can optionally include the apparatus being a mobile device or a computing system.

What is claimed is:
1. An apparatus for mitigating unauthorized access to data traffic, the apparatus comprising:
   a hardware processor;
   memory;
   an operating system stack to allocate unprotected kernel transfer buffers in the memory;
   a host controller to receive data from peripheral hardware, wherein the data is at least one of video data or audio data, and wherein a policy is constructed to automatically control access to the data based on a location of the apparatus;
   a hypervisor to allocate protected memory data buffers and secure memory mapped input/output (MMIO) regions, wherein the hypervisor is booted in a secure manner and the secure boot of the hypervisor is verified, wherein addresses for the protected memory data buffers are to be stored in the secure MMIO regions, wherein the data is to be stored in the protected memory data buffers before being copied to the unprotected kernel transfer buffers and before the data is accessed by operating system drivers for the peripheral hardware, wherein the protected data buffers are only accessible by trusted applications, wherein the hypervisor is located above the host controller in a data processing flow and below a video or audio driver in the data processing flow; and an encoder module to encrypt the data stored in the protected memory data buffers, wherein the unprotected kernel transfer buffers receive a copy of the encrypted data.

2. The apparatus of claim 1, wherein the hypervisor is configured to protect the protected memory data buffers using extended page tables so that the protected memory data buffers are not accessible to unauthorized software.

3. The apparatus of claim 2, the apparatus further comprising:
an input/output memory management unit programmed by the hypervisor to control access to the protected memory data buffers, wherein the protected memory data buffers are not accessible by unauthorized user equipment.

4. The apparatus of claim 3, wherein the unprotected kernel transfer buffers and the protected memory data buffers are to be allocated when an authorized application that will use the data is initialized.

5. The apparatus of claim 3, wherein the hypervisor is configured to allocate the secure memory mapped input/output (MMIO) regions, wherein pointers to the protected memory data buffers are to be stored in the secure MMIO regions.

6. The apparatus of claim 5, wherein only authorized user equipment can access the secure MMIO regions.

7. The apparatus of claim 1, the apparatus further comprising:
an input/output memory management unit to ensure that the data stored in the protected memory data buffers originated from an authorized source and was not subject to modifications or replay attacks by malware.

8. The apparatus of claim 7, wherein the input/output memory management unit is configured to validate data integrity by verifying at least one cryptographic hash or at least one signature passed with the data from the authorized source.

9. The apparatus of claim 1, wherein the unprotected kernel transfer buffers are used to copy the data to an application that requested the data.

10. The apparatus of claim 9, wherein the application that requested the data is configured to decrypt the data.

11. The apparatus of claim 1, wherein the protected memory data buffers are to be protected by the hypervisor.

12. The apparatus of claim 1, further comprising:
memory, wherein the memory includes at least one access control policy that does not allow access to data from the peripheral hardware when the apparatus is in a secure area but does allow access to data from the peripheral hardware when the apparatus is outside of the secure area.

13. At least one non-transitory machine readable storage medium comprising instructions that, when executed, cause an apparatus to:
allocate unprotected kernel transfer buffers in a memory element;
receive data from peripheral hardware at a host controller, wherein the data is at least one of video data or audio data, and wherein a policy is constructed to automatically control access to the data based on a location of the apparatus;
allocate protected memory data buffers and secure memory mapped input/output (MMIO) regions using a hypervisor, wherein the hypervisor is booted in a secure manner and the secure boot of the hypervisor is verified, wherein the data is stored in the protected memory data buffers before being copied to the unprotected kernel transfer buffers and before the data is accessed by operating system drivers for the peripheral hardware, wherein addresses for the protected memory data buffers are to be stored in the secure MMIO regions, wherein the hypervisor is located above the host controller in a data processing flow and below a video or audio driver in the data processing flow;
encrypt the data stored in the protected memory data buffers, wherein the protected data buffers are only accessible by trusted applications; and
copy the encrypted data to the unprotected kernel transfer buffers.

14. The medium of claim 13, wherein the protected memory data buffers are protected by the hypervisor using extended page tables so that the protected memory data buffers are not accessible by unauthorized software.

15. The medium of claim 14, further comprising instructions to:
control access to the protected memory data buffers using an input/output memory management unit programmed by the hypervisor, wherein the protected memory data buffers are not accessible by unauthorized user equipment.

16. The medium of claim 13, wherein, the unprotected kernel transfer buffers and the protected memory data buffers are allocated when an authorized application that will use the data is initialized.

17. The medium of claim 13, wherein pointers to the protected memory data buffers are stored in the secure MMIO regions.

18. The medium of claim 17, wherein only authorized user equipment can access the secure MMIO regions.

19. The medium of claim 13, further comprising instructions to:
ensure that the data stored in the protected memory data buffers originated from an authorized source and was not subject to modifications or replay attacks by malware.

20. The medium of claim 19, further comprising instructions to:
validate data integrity by verifying at least one cryptographic hash or at least one signature passed with the data from the authorized source.

21. The medium of claim 13, wherein the unprotected kernel transfer buffers are used to copy the data to an application that requested the data and the application that requested the data decrypts the data.

22. A method for mitigating unauthorized access to data traffic, comprising:
allocating, using a hardware processor, unprotected kernel transfer buffers;
receiving data from peripheral hardware, wherein the data is at least one of video data or audio data, and wherein a policy is constructed to automatically control access to the data based on a location of the apparatus;
allocating protected memory data buffers and secure memory mapped input/output (MMIO) regions using a hypervisor, wherein the hypervisor is booted in a secure manner and the secure boot of the hypervisor is verified, wherein the data is stored in the protected memory data buffers before being copied to the unprotected kernel transfer buffers and before the data is accessed by operating system drivers for the peripheral hardware, wherein the protected data buffers are only accessible by trusted applications, wherein addresses for the protected memory data buffers are to be stored in the secure MMIO regions, wherein the hypervisor is located above a host controller in a data processing flow and below a video or audio driver in the data processing flow;

encrypting the data stored in the protected memory data buffers;

copying the encrypted data to the unprotected kernel transfer buffers; and allocating secure memory mapped input/output (MMIO) regions, wherein addresses for the allocated protected memory data buffers are stored in the secure MMIO regions.

23. The method of claim 22, further comprising:

protecting the memory data buffers with the hypervisor using extended page tables so that that protected memory data buffers are not accessible to unauthorized software; and controlling access to the protected memory data buffers using an input/output memory management unit programmed by the hypervisor, wherein the protected memory data buffers are not accessible by unauthorized user equipment.

* * * * *